United States Patent [19]

Lynch

[11] 4,337,152
[45] Jun. 29, 1982

[54] AERATION APPARATUS AND METHOD

[75] Inventor: John F. Lynch, Aston, Pa.

[73] Assignee: Frebar Holding AG, Zug, Switzerland

[21] Appl. No.: 946,141

[22] Filed: Sep. 27, 1978

[51] Int. Cl.$^3$ ............................ C02F 3/22; B01F 3/04
[52] U.S. Cl. .................................... 210/197; 210/220; 261/77; 261/121 R; 261/DIG. 75
[58] Field of Search .................. 210/7, 14, 15, 60, 62, 210/63 R, 63 Z, 194, 197, 218-220, 221 R; 261/77, 93, 121 R, DIG. 75; 366/3, 4, 10, 11, 101, 136, 265, 266

[56] References Cited

U.S. PATENT DOCUMENTS

| | | | |
|---|---|---|---|
| 895,229 | 8/1908 | Beddoes | 210/15 |
| 1,733,244 | 10/1929 | Smith | 210/197 X |
| 1,867,824 | 7/1932 | Hammerly | 210/220 X |
| 1,900,809 | 3/1933 | Hammerly | 210/194 |
| 1,992,451 | 2/1935 | Thurstensen | 261/93 |
| 2,241,337 | 5/1941 | Work | 366/101 X |
| 2,295,391 | 9/1942 | Durdin, Jr. | 210/219 X |
| 2,479,403 | 8/1949 | Powers | 210/7 |
| 2,597,802 | 5/1952 | Kappe | 210/197 |
| 2,633,344 | 3/1953 | Pekk | 210/197 X |
| 3,334,868 | 8/1967 | Lage | 366/136 |
| 3,661,364 | 5/1972 | Lage | 366/136 |

FOREIGN PATENT DOCUMENTS 720248 10/1965 Canada ............................ 210/194
582801 8/1933 Fed. Rep. of Germany ....... 210/197

Primary Examiner—Robert H. Spitzer
Attorney, Agent, or Firm—Sherman & Shalloway

[57] ABSTRACT

A gas-liquid mixing process and apparatus, particularly applied to aeration, especially associated with activated sludge waste-water treatment, wherein complete, efficient mixing of the gas and liquid is achieved initially in a pre-mixing draft tube and secondly in an outer mixing vessel by imparting a turbulent, random generally outward and upward radial motion to the liquid and gas contents of the vessel. A portion of the contents of the vessel is withdrawn and recirculated through the pre-mixing draft tube substantially axially vertically situated within the outer mixing vessel. A lower end of the draft tube has a nozzle opening which produces a net flow which is an axially symmetrical radial jet of recirculating contents, thereby establishing the desired turbulent random motion. In the case of aeration in waste-water treatment, air or other oxygen-containing gas is introduced into the draft tube. The complete and consistent high efficiency of the apparatus and the method used thereby provides significant results in that the energy/dissolved oxygen and detention time per tank is significantly reduced.

3 Claims, 10 Drawing Figures

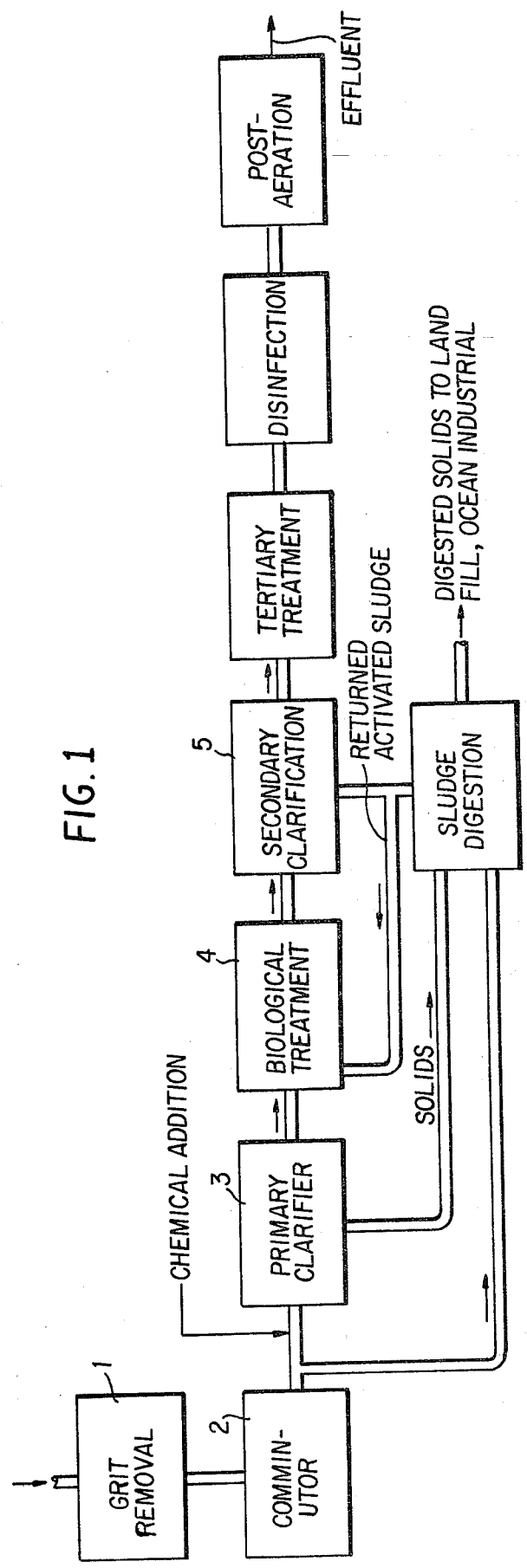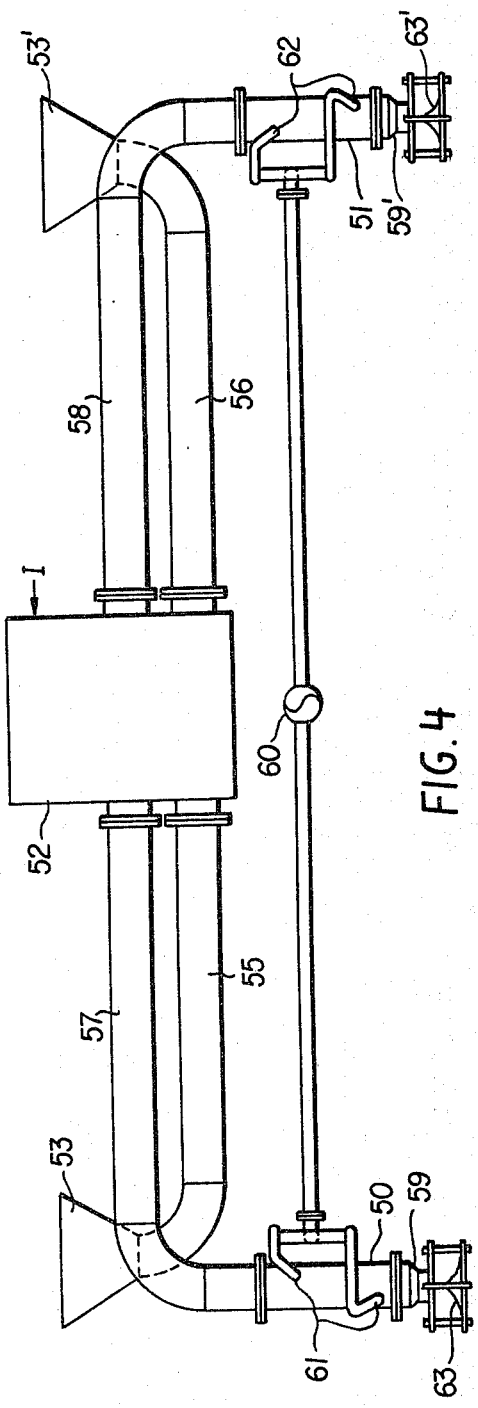

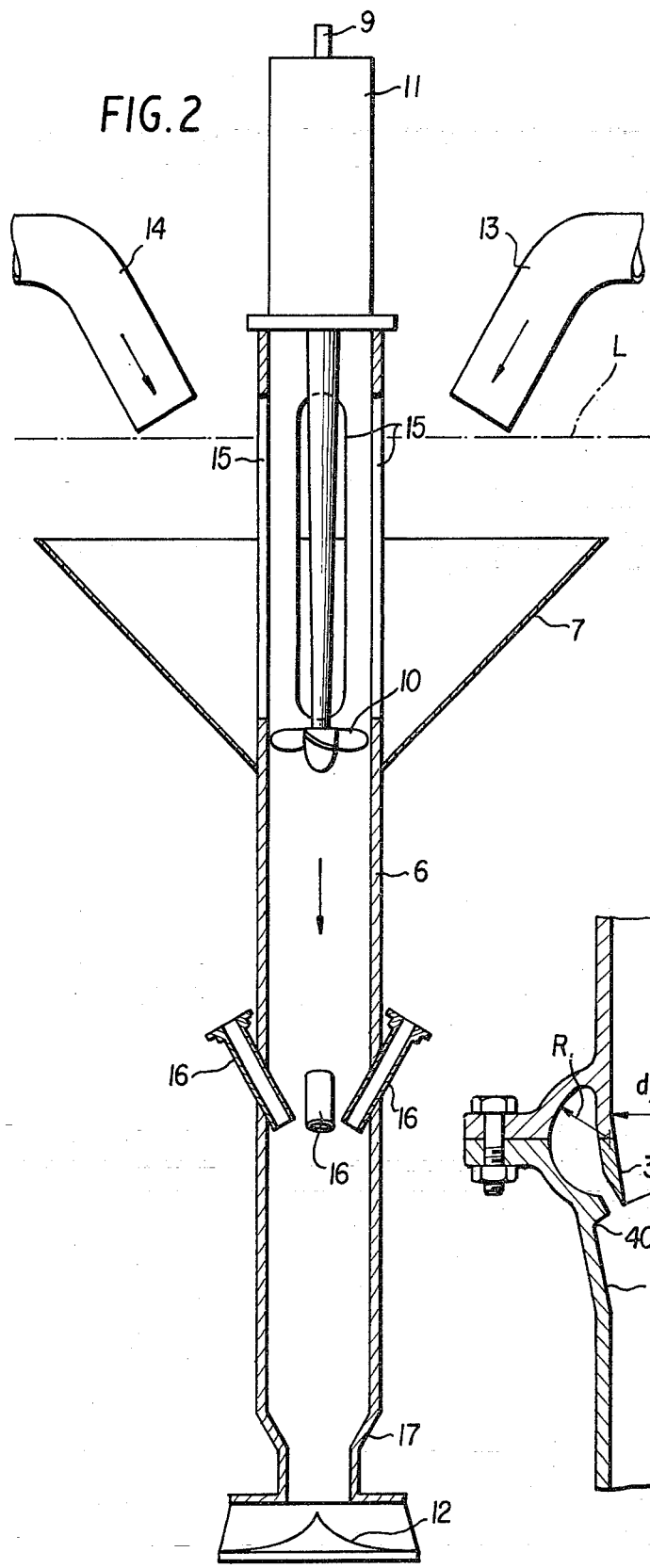
FIG. 2
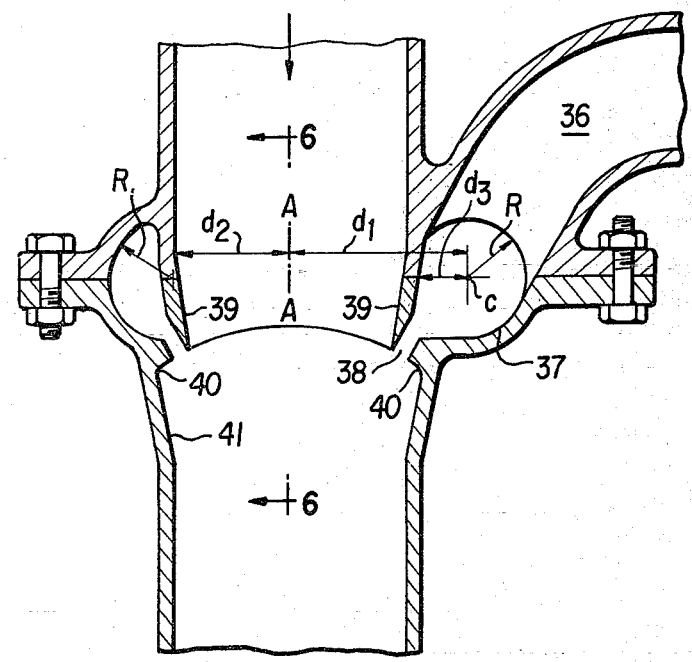
FIG. 6
FIG. 5

AERATION APPARATUS AND METHOD

BACKGROUND OF THE INVENTION

1. Field of the Invention

The present invention generally relates to an apparatus and process for mixing a gas and a liquid and, more particularly, relates to the field of aeration associated with waste-water treatment and the control of water-pollution wherein waste-water is aerated or mixed with other gases.

2. Description of the Prior Art

Pollution and the control of pollution have become quite important in recent years. In the past, pollution control was concerned primarily with problems caused by domestic and the simpler waste of industry. In this respect, control was aimed principally toward protecting downstream public water supplies and stopping or preventing nuisance conditions.

It is no longer true that pollution problems are either local in extent and control or a matter solely of local consideration. Thus, national growth and change have altered this picture considerably and the stopping of pollution is an ever-increasing national problem.

The growth of the population has far outdistanced progress in stopping pollution and the increased production of goods has greatly increased the amounts of common industrial wastes. Conventional biological waste treatment processes are hard-pressed to hold the pollution line, and for a growing number of larger cities, conventional processes are no longer adequate. Accordingly, a great deal of study and research has been conducted to develop more efficient and better processes for treatment of waste-waters.

Municipal wastes usually contain oxygen-consuming pollutants; synthetic organic chemicals, such as detergents; sediments; and other types of pollutants. Industrial wastes could contain a wide diversity of constitutents and, in addition, substantial amounts of heat from cooling processes. Also, water that drains off the land usually contains quantities of organic matter in addition to sediments and may also contain radioactive substances and other pollutants washed from the atmosphere from vegetation, etc. Accordingly, efficient and effective waste-water treatment processes are needed which can remove and eliminate each of these various types of pollutants.

At this time, wastes are generally treated by two basic methods, called primary and secondary methods or stages, with, optionally, a tertiary stage in the treatments. The primary method or stage is one in which the raw waste material is treated to remove the settleable solids, i.e., clay, bits of organic wastes and oil droplets, etc. This state is one which is mostly mechanical. For example, as the sewage enters a plant for primary treatment, it flows through a screen which removes large floating objects, such as rags and sticks, that may clog pumps and small pipes. After the sewage has been screened, it passes through a grit chamber where sand, grit, cinders and small stones are allowed to settle to the bottom. Suspended solids are then removed in a settling tank. Other mechanical treatments which can be utilized in the primary method or stage of waste treatment include, for example, flotation methods, coagulation and flocculation. All of these methods are mechanical and comprise a method for removing the suspended particles in the raw sewage. The secondary method or stage in waste-water treatment is basically biological in nature and can remove up to 95% and sometimes more of the organic matter in the sewage by making use of bacteria. Such secondary treatment is designed to remove dissolve materials such as sugars, starches and phenols, which are susceptible to biological treatment. The two principal types of secondary treatment are the trickling filter and the activated sludge process. In addition, use has been made of stabilization ponds and aeration lagoons, all these methods in the secondary stage of treatment working on the same basic principle, i.e., the enchanced biological degradation or consumption of the organic compounds.

Aeration is the mass transfer process by which a gas is transferred into a subsaturated liquid. The purpose of aeration in the activated sludge system of waste-water treatment is to efficiently dissolve oxygen into mixed liquor (mixed sewage or other waste-water influent and recycled activated sludge) as well as to keep the mixed-liquor suspended solids (MLSS) in suspension. In the present state of the art, most of the aeration of waste-water is performed by mechanical surface aerators, air diffusers or sparge-turbines.

The mechanical surface aerators entrain the air in the water on, over or close to the surface of water. There is a water circulation pattern set-up which is from the lower region of the vessel through a central draft tube located below the turbine, into the turbine or aeration unit.

Sparging air into the water in most cases is accomplished by forcing air to flow through a conduit which has small holes through its wall. The air passes through the holes in the conduit wall into the waste-water. Another method of sparging is to use a porous ceramic shape and force the air through the porous ceramic into the water.

In the activated sludge method, after the sewage leaves the settling tanks of the primary treatment facilities, it is pumped to an aeration tank in which it is mixed with previously activated sludge and subjected to aeration for up to several hours. During the time in which the sewage, bacteria and air are in contact, the bacteria break down the organic matter in the sewage. The sewage leaving the aeration tank in the form of a mixed liquor thereafter flows to a final sedimentation tank to remove the solids produced in the aeration tank. The basic secondary treatment of the sewage can then be followed by disinfection of the effluent.

The sludge which has been previously activated is returned to the aeration tank for mixing with new sewage and additional amounts of water. This allows the activated sludge process of the secondary treatment stage to be conducted continuously with recycling of the activating sludge.

Practically all sewage treatment plants in operation or being built today make use of some form of activated sludge treatment process. The process is similar to nature's way of recycling materials for reuse but with an effort made to greatly accelerate the treatment. The process is basically bio-conversion and, with proper clarification, the treated water is released from the plant as the effluent to rejoin the environment via rivers and the sea. Excess or wasted sludge not used or needed in the ongoing oxidation process must be further digested and eventually disposed of as inert matter in land fills, sea dumps, farming, etc.

While the activated sludge process has many advantages when compared with other conventional techniques, the activated sludge process has certain disadvantages also. For example, the activated sludge process is more costly to operate than, for example, the trickling filter method or the reactor process. In addition, conventional activated sludge processes sometimes lose their effectiveness when faced with difficult industrial wastes. From a practical viewpoint, large, slow-speed turbines throw blades causing imbalance. Rags caught in the turbine are more often than not the cause of this problem. Pump-type surface aerators have a tendency to freeze up on cold climates. Plugging of diffusers constitutes a continuous maintenance problem for the operating staff. Accordingly, while the activated sludge process is the best available secondary treatment process, it is not wholly satisfactory.

The conventionally used processes for contacting the sewage with air have shown to be quite inefficient. For example, it has been discovered that the foregoing mechanical and forced air methods of waste-water treatment have an oxygen transfer efficiency of less than about 10%, i.e., less than 10% of the oxygen in the air is transferred to the sewage. In addition, it has been discovered that, in terms of pounds of oxygen transferred to the sewage or absorbed by the sewage per horsepower hour, the mechanical method and forced air method allow an absorption of less than about 3 pounds of oxygen per horsepower hour. Accordingly, it can be seen that, if the transfer efficiency of the oxygen transferred or absorbed by the sewage can be increased, the activated sludge process can be substantially improved. The present invention was developed as the result of efforts to eliminate the foregoing problems and disadvantages of conventional processes.

After the secondary treatment stage of the method, the effluent is subjected to optional tertiary treatment operations designed to eliminate residual dissolved organic and inorganic compounds. These materials can be removed by electrodialysis or ion exchange and such operations as distillation, freezing or other desalinization-type techniques. In addition, activated carbon has been used. Also, municipal waste-waters generally contain many organic materials which are only partially removed by the foregoing conventional treatment methods. A good example of these types of organic materials are detergents. Oxidants such as ozone and chlorine have been used to improve the taste and odor qualities or to disinfect municipal drinking water. These materials improve the quality of the water by destroying or altering the structure of the chemicals in the water and provide disinfection by destroying bacteria.

The use of such disinfectants and oxidants in the treatment of waste has not been as effective as possible due to inadequate mixing. However, a more efficient method of contacting the ozone or chlorine with the waste could provide an effective means for disinfecting sewage. Accordingly, the present invention has been developed as the result of research in connection with such a problem.

With this understanding of sewage treatment, it quickly becomes apparent that the basic question as to what bio-conversion system to use centers on the degree to which the system can remove or oxidize the biodegradable materials present while minimizing the wasted sludge produced and do this for the least capital expenditure and the minimum operating cost. The key to securing this optimum system lies in effectively and efficiently conducting the bio-conversion process to consume the "food". Thorough and complete mixing of the food (from the sewage or sludge) and oxygen (from the air) with the bacteria in the water is a necessity in such a process. It, therefore, becomes imperative to use a most effective and energy-efficient mixing process.

The complete mixing of activated sludge is a basic process in which the incoming raw waste is completely mixed with the entire contents of the aeration tank so that the degree of degradation of the organic material does not vary from one portion of the tank to the other. Accordingly, it is quite advantageous if the mixing of the air with the sewage and absorption of the same can be effective so as to be uniform over and within the entire tank. This has been achieved with efficiency in accordance with the process of the present invention.

In the activated sludge treatment, the stabilization or degradation of the organic matter is brought about by the biochemical activities of the microorganisms in the system. The bacteria are primarily responsible for the stabilization of the organic matter in activated sludge systems, the bacteria removing organic matter from wastes in order that they might obtain sufficient energy to remain alive, to produce new cells and to obtain the chemical components for the new cells. The bacteria present in the sewage must have oxygen to do their part in breaking down the sewage; accordingly, oxygen must be introduced into the activated sludge process in order to bring about the necessary stabilization of the organic matter. It is the ineffective transfer of oxygen to the sewage that has brought about the previously described defects and disadvantages of previous proposals.

In its broadest aspects, the principles of the aeration mixing process and various features of the aeration mixing apparatus of the present invention are generally described in U.S. Pat. Nos. 3,334,868 and 3,661,364, to James R. Lage. However, in the environment of the present invention, particularly as it relates to waste-water treatment, especially aeration, it was necessary to make many modifications and adjustments of the basic process and apparatus in order to realize the potentials and benefits possible in such gas-liquid mixing system.

The gas-liquid mixing process of this invention can be utilized with any substances capable of flowing but, in biological waste-water treatment, it is used principally to mix liquid and gas. More specifically, the process may be used in the high rate aeration, bio-oxidation, digestion and disinfection stages of sewage or other waste-water treatment. The gas involved in all of these mixing stages is air or other oxygen-containing gas, including pure oxygen, oxygen enriched air, oxygen-nitrogen mixtures, ets. except for the disinfection state, which employs chlorine or ozone.

SUMMARY OF THE INVENTION

The present invention has solved the problems and disadvantages of previous processes in the treatment of waste, particularly with regard to the complete mixing of activated sludge by providing an efficient and economical process and apparatus for achieving effective mixing of a gas and liquid whereby increased oxygen-transfer efficiency, for example, can be achieved. In addition, the present invention has provided a vehicle for the use of chlorine or ozone to disinfect the clarified waste-water by providing an effective means of mixing these materials with the water.

In accordance with the present invention, the complete and efficient mixing of a gas and liquid is achieved by imparting a turbulent random generally outwardly radial motion to the liquid and gas contents of a mixing vessel by withdrawing a portion of the contents and recirculating the same through an inner pre-mixing draft tube which is substantially axially situated within the outer mixing vessel. The draft tube has a lower end which opens into the mixing vessel and spaced a short distance above the bottom of the mixing vessel or other solid obstacle, the lower end of the draft tube having a nozzle outlet producing a net flow which is an axially symmetrical radial jet of recirculating contents, thereby establishing the necessary random motion. In the case of aeration, in the activated sludge process for example, air is introduced into the system through the inner pre-mixing draft tube.

The apparatus of the present invention capable of carrying out the foregoing process includes an outer mixing vessel, inlet and outlet means for the outer mixing vessel, a pre-mixing draft tube substantially vertically axially aligned within the outer mixing vessel and having a nozzle opening at one end and mixing and recycling means for continuously mixing and recycling the contents of the outer mixing vessel through the draft tube and nozzle.

This invention presents a new and novel apparatus system and process for aerobic, such as activated sludge, and other systems of waste-water treatment. The employment of this invention offers numerous advantages, some of which are: the atmosphere, the cheapest source of oxygen is used; hydraulic mixing is used which has no limits on the aeration basin power level, which is most significant in that it permits a reduction in tank volume and reduces costs, compared to mechanical mixing with its limitations due to velocity and cavitation; there are no constraints on the geometry of the aeration basin, actually the basin and apparatus become integral arts of the system; maintenance costs are low as there are normally no moving parts in the vessel requiring repairs; high rates of oxygen transfer are achieved between the air, water and biological system; excellent uniformity of dissolved oxygen is maintained through-out the basin; the percentage of suspended solids throughout the basin is maintained at a uniform level; and higher BOD and solids loadings are possible, enabling reduced basin size and cost reduction.

The mixing system as applied to any of the aeration stages of a waste-water treatment plant utilizes a central tubular reactor assembly (hereinafter referred to as a pre-mixing draft tube) integrated into a vessel (tank) to produce both the pre-mixing of the air with the concentrated waste-water (mixed liquor) and, in turn, the mixing of the liquor within the vessel to maintain process homogeneity. As the liquor passes through the pre-mixing draft tube, air is also injected into the draft tube in such a manner that the air (oxygen) is almost immediately dissolved in the liquor at near saturation levels by the high turbulent action designed in the system. Thus, the liquor emanating from the draft tube into the vessel already contains a high dissolved oxygen content for consumption by the bio-mass contained within the vessel. By proper control of both the liquid and air velocities in and upon exiting from the draft tube, a vigorous random turbulent mixing action is generated in the vessel.

It should be noted that this process not only produces the required oxygen transfer and mixing action within the aeration basin, but does so with a minimum of wasted energy, i.e., virtually all the energy input to the liquid by the pumping means (including the injected air) is used efficiently to dissolve the oxygen, transfer it to the cells (bacteria) and secure maximum homogeneity in the bio-conversion process. Thus, there is little wasted liquid motion, particularly at the surface, to consume valuable energy.

By utilizing the mixing process in the plant stages cited previously, a waste-water treatment system has been deviced which simultaneously provides excellent efficiencies (maximum removal of waste) while effecting substantial cost savings. Operating results have demonstrated the following characteristics for the treatment plant utilizing the invention mixing system with the potential (depending upon State regulations) savings found.

First, no primary settling tank or clarifier (first major conventional stage after the influent grit chamber) is needed or tank volumes and/or detention times can be significantly reduced. The high mixed liquor suspended solids level which can be maintained in this treatment system makes a normal level of inerts less of a deterrent to the bio-conversion process. In fact, as compared to conventional systems capable of operating at maximum MLSS levels of only about 4000 or even less, the present system can operate effectively and at substantial cost savings with MLSS levels of from 7,000 to 20,000 or even higher, potentially as high as 50,000 at optimum conditions. In this manner, all of the waste is kept in the entire system for the substantially complete elimination of all biodegradable material rather than partially removing these settleable wastes from the system at the first stage. Elimination or reducton of this stage also saves between 10–15% of the plant costs (exclusive of waste sludge treatment).

Second, the first aeration stage in this system becomes a high rate process which effectively removes 90–95% of the dissolved waste while requiring much shorter detention times ($\frac{1}{4}$ to $\frac{1}{2}$) than conventional, less effective surface aerated stages. Such reductions in detention times result directly in the use of smaller volume basins (or tanks) resulting in basin capital cost savings of from 50–75% or about 15–20% of the plant costs. Further, since it is also desirable to use deep tank configurations for high transfer efficiencies, very substantial reductions in land areas required for the aeration stages can be realized. Typically, reduction factors of 5 to 10 could be gained over conventional systems.

Third, the invention system generally utilizes a second aeration or bio-oxidation stage for the maximum oxidation of the sludge produced while eliminating any residual dissolved biodegradable waste. This extra stage is more than offset in cost by the reduction in the need for wasted sludge digester and dewatering capacity. This two-stage type of aeration process also provides considerable load surge capability (50% or greater) without significant deterioration in effluent.

Fourth, the employment of the invention mixing process in the final or disinfecting stage of the system allows dispersal of the chlorine or ozone in the clarified water so effectively that less gas and shorter detention times should be required for the same degree of disinfecting action. Additional savings in operating and construction costs should, therefore, be realized in this stage as well.

Finally, of particular importance in future plant operations, is the fact that the reactor process outlined here lends itself to automatic control. With the regulation of liquid velocities, air velocity and volume, and a basically uniform process, automatic control of such aeration stages could be created to insure both good plant operation (in terms of quality of effluent for varying influent conditions) and minimum energy consumption which is of general environmental concern.

In summary, taking full advantage of the invention mixing system characteristics cited, a waste removal of between 90–95% (85% presently required by most areas) is obtained with minimum waste sludge disposal requirements while requiring as much as 20–30% less expenditure in plant capital cost (exclusive of sludge treatment) as well as reduced plant operating costs. Again, the degree of savings (not performance) secured is dependent on the detailed intra-plant regulations imposed by the areas.

Accordingly, it is a principal object of the present invention to provide a novel process and apparatus for the mixing of a gas and liquid, which process provides efficient and complete mixing of the two.

It is a further object of the present invention to provide such novel process and apparatus for the mixing of a gas and liquid, principally in waste-water treatment, wherein such mixing occurs efficiently and effectively and without the disadvantages and defects of conventional procedures.

It is yet a further object of the present invention to provide such a novel process and apparatus for the mixing of a gas and liquid in sewage treatment wherein, in activated sludge treatment, the air and sewage are intimately and efficiently contacted with a substantially higher oxygen transfer efficiency than possible with conventional procedures.

A still further object of the present invention comprises an improved procedure for chlorination, ozonization or similar procedures wherein a gas is mixed with a liquid, such process being characterized by complete and efficient mixing at lower cost than possible with previously proposed procedures.

A still further objective of the present invention comprises such novel gas-liquid mixing process wherein complete and efficient mixing of the gas and liquid is achieved by imparting a turbulent, random generally outward and upward radial motion to the liquid and gas contents of a mixing vessel by withdrawing a portion of such contents and mixing the withdrawn portion with incoming liquid which is recirculated to the upper end of a pre-mixing draft tube which is substantially axially situated within the outer mixing vessel and having a lower end which opens into the outer mixing vessel, the lower end of the draft tube having an outlet supplying a net flow which is an axially symmetrical jet of recirculating contents, thereby establishing the necessary turbulent motion, while effecting additional mixing and imparting additional turbulence in the draft tube both above and below the air inlet situated between the upper and lower ends of the draft tube.

Yet a further object of the present invention relates to such apparatus for the complete and efficient mixing of a gas and a liquid including an outer mixing vessel, inlet and outlet means for the outer mixing vessel, a pre-mixing draft tube substantially axially aligned within the outer mixing vessel and having a nozzle opening at one end, and mixing and recycling means for continuously recycling the contents of the outer mixing vessel through the draft tube and nozzle.

Another object of this invention is a novel improved apparatus system and process for the aeration of aerobic and other waste-water systems by the employment of several principals of fluid dynamics, such as constrained high-intensity turbulence, shear impact on a stationary surface, wake flow, and predetermined flow path all operating within the apparatus and basin simultaneously to induce an efficient mixing action which enables the generation of a fine bubble dispersion of gas in the liquid media of the aeration basin, maximizing both the surface area per unit volume of gas introduced and the length of time the gas is entrained in the liquid, resulting in high oxygen transfer rates between the air and water.

Another object of this invention is a novel improved apparatus system and process for aeration of aerobic and other waste-water systems providing efficient mixing at a high capacity of the entire basin contents within a short time, enabling a uniform distribution throughout all parts of the basin of both the dissolved oxygen and suspended solids.

Yet another object of this invention is a novel improved apparatus system and process that provides in design a method whereby the apparatus and basin become an integral part of the system and process.

Another object of this invention is a novel improved apparatus system and process making the apparatus and basin an integral part of the system and providing a countercurrent gas-to-liquid flow within the vessel, reducing the resistance to oxygen transfer between the air bubbles, water, and between the water and the biological mass.

Another object of this invention is a novel improved apparatus system and process that permits all incoming waste-water, recycled sludge, and part of the basin contents to be immediately mixed together, aerated, and mixed with the total contents of the basin in the activated sludge aerobic waste-water treatment and other waste-water treatment systems.

Another object of this invention is a novel improved apparatus system and process with the ability to satisfy a much higher than normal BOD (Biological Oxygen Demand) and handle a much higher than normal suspended solids, both of which when combined, allow shorter retention time for the contents of the aeration basin, enabling the use of volumetrically smaller, less costly aeration basins.

Another object of this invention is a novel improved apparatus process and system enabling the reduction of the biological sludge volume resulting from the activated sludge and other waste-water systems.

Another object of this invention is a novel improved apparatus system and process providing a post aeration treatment after the disinfection treatment of a waste-water system, enabling enrichment of the oxygen content and elimination of free disinfectant from the plant effluent.

Another object of this invention is a novel improved apparatus system and process providing automatic control of the volume of air flow to the apparatus relative to the D.O. (Dissolved Oxygen) content of the vessel.

Accordingly, while the present invention will be described hereinafter specifically with reference to the treatment of sewage and activated sludge treatment in particular, it should be recognized clearly that the present invention is in no way limited thereto.

BRIEF DESCRIPTION OF THE DRAWINGS

These objects and features as well as others will become apparent to those skilled in the art by referring to the Specification and accompanying drawings, in which:

FIG. 1 is a flow diagram of a typical waste-water treatment process capable of utilizing the process of the present invention;

FIG. 2 is a vertical cross-sectional view of an embodiment of an aeration mixing unit according to the invention;

FIG. 4 is a perspective view of another embodiment of an aeration apparatus according to the invention.

FIG. 5 is an enlarged cross-sectional view of the air inlet shown in FIG. 3;

FIG. 6 is a sectional view taken along lines 6—6 of FIG. 5;

DETAILED DESCRIPTION OF THE INVENTION

Figure 3:
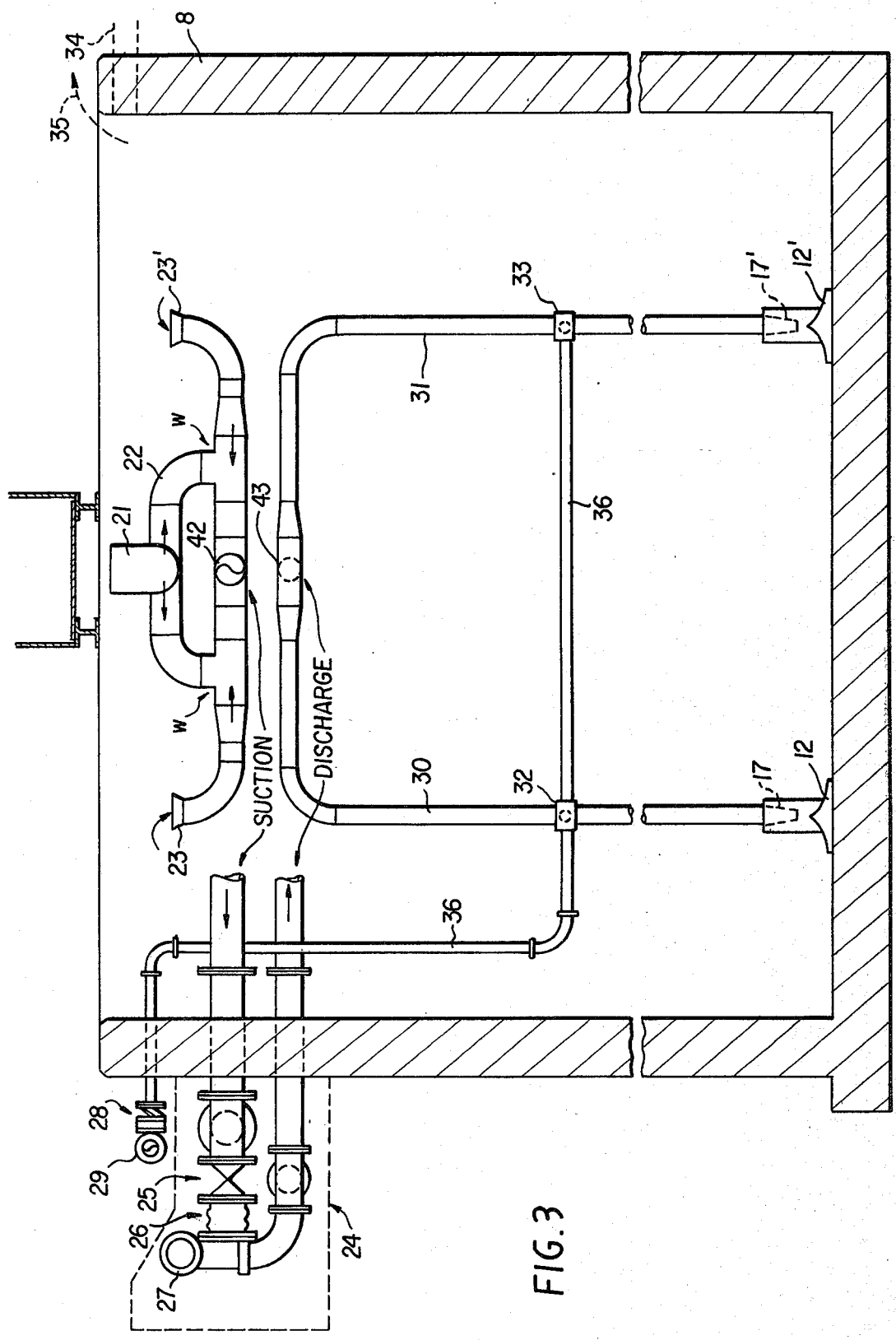
FIG. 3 is a perspective view of another embodiment of an aeration apparatus according to the invention.

Referring to FIG. 1, it is noted that the illustration shows in simplified form the primary, secondary and tertiary treatments and post treatments carried out in waste-water treatment. In the primary treatment stage, the influent, e.g., raw sewage, is treated to remove the largest suspended impurities. This primary treatment includes grit removal 1 and comminution 2 and a primary clarification 3 of the waste. Additional chemicals, e.g., flocculants, can be added to enhance these processes, if necessary. This first primary stage of waste-water treatment includes flotation tanks, centrifugation and flocculation systems.

The secondary or biological treatment is illustrated by the activated sludge process 4 and secondary clarification 5 and digestion of the solids. The secondary treatment is designed to remove dissolved organic compounds, generally by biological action. As will be more clearly described hereinafter, the process of the present invention has particular application to the activated sludge process.

After the secondary treatment of the waste-water, the effluent is subjected to a tertiary treatment (e.g., filtration) and then to disinfection with ozone or chlorine, as previously described. A post aeration step to ensure adequate oxygen levels in the clarified and disinfected water prior to leaving the waste-water treatment facility will generally be included, again depending on local, state or Federal regulations.

One embodiment of the reactor aeration apparatus according to this invention is illustrated in FIG. 2. This system utilizes a multiplicity of principles of fluid dynamics, such as turbulent flow, jet action, wake flow, impact and recycling, each of which induces an efficient mixing action.

A pre-mixing draft tube 6 is substantially axially vertically aligned within an outer mixing vessel 8. The draft tube 6 has a funnel 7 mounted thereabout at its upper end and located in the draft tube 6 is a shaft 9 which supports a propeller 10. The shaft 9 is connected to a rotary power source to cause rotation of the shaft 9 and the propeller 10. A suitable bearing support system is located within a housing 11 to support the shaft 9 and propeller 10 within the draft tube 6. When the propeller 10 is rotated, liquid in the draft tube 6 is forced downward toward a swash plate 12 located close to the bottom of the outer mixing vessel 8. The liquid media or contents of the outer mixing vessel 8, which is at a level L above the top of the funnel 7, flows over the lip of the funnel 7. Supported above the funnel is a liquid inlet conduit 13 which supplies incoming liquid, such as raw influent (raw sewage or other waste-water, e.g., industrial effluent, domestic sewage, etc.) and projects the liquid into the funnel 7. In the case of an activated sludge waste-water treatment system, as shown in FIG. 1, raw influent is supplied from the primary clarifier 3. However, because of the capabilities of the mixing system to handle much higher than normal solids loadings the raw influent can be supplied directly from the grit removal 1 or comminution 2. A recycling conduit 14 is also located over the funnel 7 and projects activated sludge such as from the underflow of a clarifier or other suitable source into the funnel 7. Effectively, the funnel 7 located below the level L of the contents of the outer mixing vessel 8, in combination with the liquid inlet conduit 13 and the recycling conduit 14, form a mixing means for pre-mixing the contents of the outer mixing vessel and the incoming liquid streams. The placement of the funnel is also effective to break up any large bubbles or sheets of air which may flow up to and over the lip of the funnel. While the aeration apparatus forms a dispersion of very fine bubbles as explained in detail below, as these bubbles flow from the bottom of the vessel to the top of the vessel, the resulting decrease of hydraulic pressure causes the bubbles to naturally expand in a known manner. In addition, there is an inevitable tendency for the bubbles to agglomerate with each other to form large bubbles or sheets of air.

After flowing over the lip of the funnel 7, the mixed contents already in the vessel and the incoming liquid streams enter the upstream side of the pumping section of the draft tube 6, above the propeller, through four inlet slots 15 equally spaced around the periphery of the draft tube. Premixing of the incoming materials takes place as the media passes through the propeller 10 which also serves to move, transfer or pump the media down the draft tube 6 at a velocity high enough to cause turbulent flow. As noted above, funnel 7 is a means for preventing air entrainment and functions to break up any sheets of air from flowing over the funnel and into the draft tube which might otherwise adversely effect the functioning of propeller 10.

Compressed gas, e.g., air or other oxygen-containing gas (including pure oxygen) in the case of waste-water treatment, is provided through air inlet ports 16, four of which are located below the propeller 10 of the draft tube 6. The inlet ports 16 are directed at a 30° downward angle, causing considerable turbulence due to the velocity of the entering air. Although shown at the same vertical level, each of inlet ports 16 or adjacent or alternate pairs of the inlet ports can be located at the different vertical level of the draft tube. Additional turbulence is also caused due to increased volume of air and liquid in the draft tube, increasing the downward flow velocity toward a mixing nozzle 17. The air injected through the inlet ports 16 forms bubbles which significantly enhances the dissolving of oxygen into the liquid. The size of the bubbles is a direct function of the liquid/air ratio. As the ratio increases, the size of the bubbles decreases, so that it is possible to obtain microbubbles having diameters on the order of one or several microns or even less than a micron at high liquid/air ratios or bubbles having a diameter of a fraction of a millimeter to one or several millimeters or greater at low liquid/air ratios. Obviously, the areas and sizes of the air inlet and draft tube also determine the size of the bubbles and their dispersion. The increased energy (high horsepower to pump) requirements to achieve the high liquid flow rates necessary to achieve the very finest size bubbles should be taken into account since the increased operating cost could offset any processing advantages.

After leaving the mixing nozzle 17, the media (mixed liquor and air) forms a free jet. Strong mixing action is caused in the jet chamber or mixing nozzle 17 due to the constrained uniform high intensity turbulence.

Flow of the free jet from the mixing nozzle 17 is diverted from the downward direction to flow in a horizontal flow by the swash plate 12, located immediately below the nozzle 17. The flow after leaving the swash plate 12 is radially in all directions from the vertical center line of the mixing aeration apparatus to the walls of the outer mixing vessel 8.

When used for waste-water treatment, the unit assembly, as illustrated in FIG. 2, is immersed in the contents of an aeration vessel so as to meet the following conditions: the lip or large diameter edge of the funnel 7 must be below the surface L of the contents by at least three inches; the propeller 10 must be far enough below the surface L of the contents so as to provide adequate head to prevent cavitation when the propeller 10 is rotated; and the lower portion of the unit including the swash plate should be located as close as possible to the bottom of the aeration vessel.

Air is supplied to the draft tube via air inlet ports 16 from a mechanical air compressor (not shown) usually a rotary-type due to high-volume, low-pressure requirements, located in close proximity to the aeration vessel. The air is transported from the compressor to the air inlet ports 16 by means of conduit of adequate size.

Strong mixing action is present between the exit of nozzle 17 and the swash plate 12 caused by the high intensity, free turbulence, shear and impact of the jet of media. After diversion, the surface area between the jet and the surrounding fluid is increased. At the same time, wake flow occurs. This enables more of the surrounding fluid to be drawn into the mixing zone, increasing the volume of high turbulence. There is a circulation flow of the gas-liquid mixture set up in the vessel or basin by the jet of media. This flow is characterized by sheer stresses providing still more turbulence which is diffused through-out the aeration basin.

Figure 7:
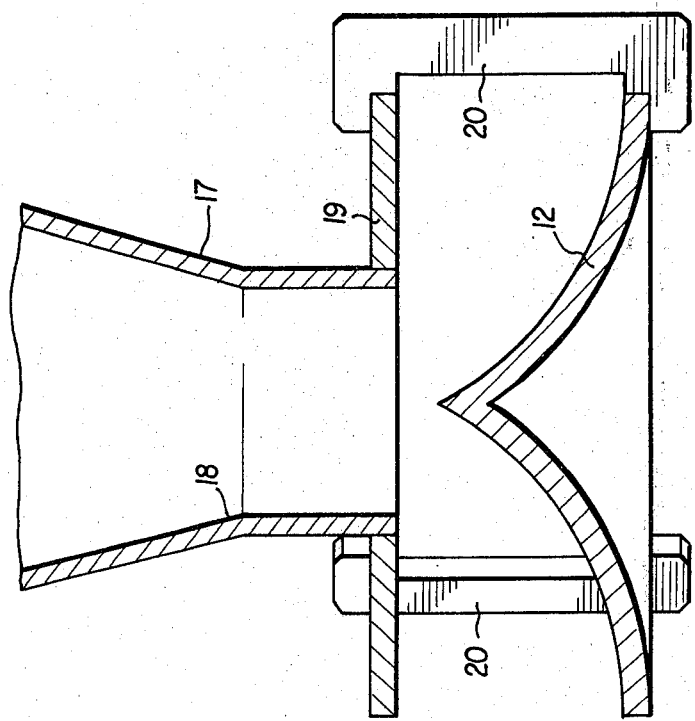
FIG. 7 is an enlarged cross-sectional view of the nozzle shown in FIG. 1.

In FIG. 7, a cross-sectional view of the nozzle 17 and swash plate 12 is shown. Generally, the nozzle is comprised of a concentric reducer 18 which increases the downward velocity of the flowing media. Immediately below the nozzle 17 is a swash plate 12 which is in the form of a cone for radially directing the downwardly flowing media outward. A flange 19 is connected to the outer portion of the nozzle 17 so that supports 20 rigidly hold the swash plate 12 in place and support it at a predetermined distance from the concentric reducer 18.

Figure 8:
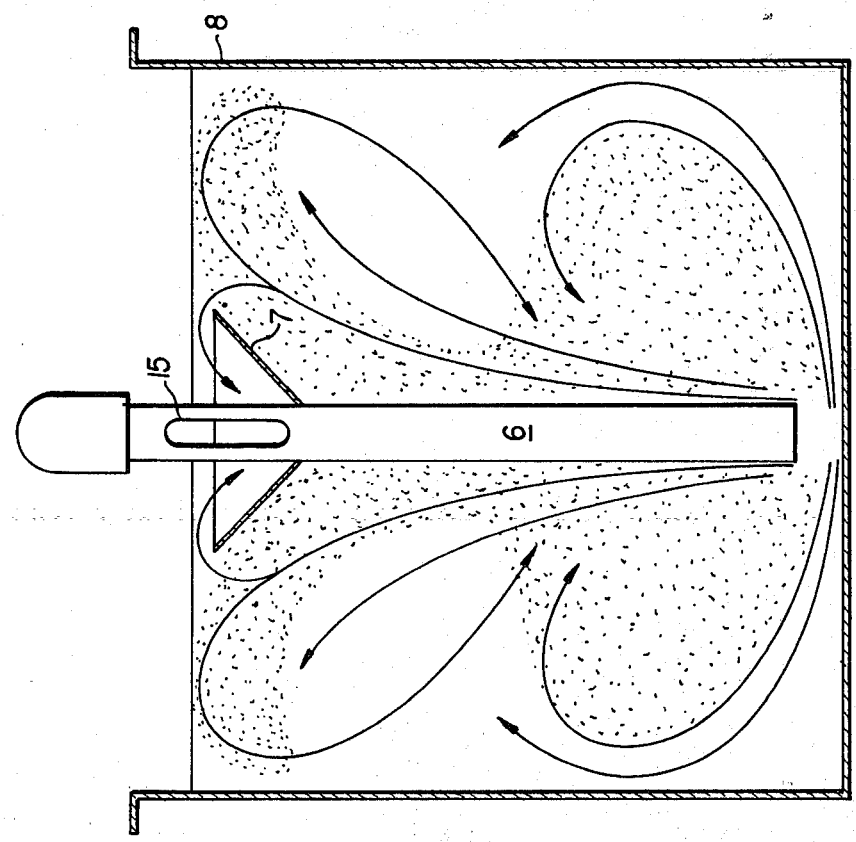
FIG. 8 is a liquid flow pattern diagram of the aeration apparatus shown in FIG. 2.

FIG. 8 illustrates the basic aeration flow patterns showing both the pre-mixing draft tube assembly and the flow pattern within the vessel itself. As the liquid emerges through the nozzle orifice it is directed at the tank bottom, causing the indicated flow pattern. As the recycled mixed liquid vessel contents and incoming liquid streams pass through the draft tube assembly, air is injected about midway down the draft tube 6 in such a manner that the air is almost immediately dissolved in the liquid at near saturation levels by the high turbulent action or shear forces designed into the system. Thus, liquid emanating from the nozzle already contains a high dissolved oxygen content for consumption by the bio-mass contained within the vessel.

By proper control of both the liquid and air velocities in the draft-tube, a vigorous mixing action is generated in the vessel by means of the double-loop pattern illustrated, thus insuring both excellent mixing and high, uniformly-distributed dissolved oxygen levels throughout the vessel. The velocity of the liquid emanating from the nozzle should be maintained sufficiently high such that the mixed liquor flowing outwardly along the bottom of the vessel attains at least a minimum critical velocity at the vessel wall below which precipitation or settling of the suspended solids can occur. This minimum critical velocity can be readily determined either quantitatively through known physical principals or empirically for any system configuration and vessel contents. Generally, however, for most vessel configurations the critical minimum velocity is about 0.05 to 10 feet per second. In addition, a counter-flow motion is generated by the rising bubbles. There is a rise flow due to air bubbles close to the center of the vessel which moves outward toward the vessel wall where it meets the rising liquid stream from the bottom of the vessel. The rising air flow and liquid stream meet and the flow is directed downward and toward the center of the basin. Most of the bubbles emanating from the nozzle move out radially due to the action of the swash plate 12 and start to rise vertically. The rising bubbles are swept inward as they rise vertically through the downward flowing stream.

The existence of a region where the downward liquid stream meets the upward bubble flow promotes a high oxygen transfer by the following probable mechanisms. The liquid film resistance to oxygen transfer is apparently reduced by the relatively high fluid-bubble velocity. The high shear field in the draft tube reduces the bubble size and the downward flow increases the length of time a bubble remains in the basin. The counter-current gas-to-liquid flow generated in the aeration and mixing system of this invention represents a new dimension in the mixing of gases and liquids for the purpose of oxygen transfer.

Figure 9:
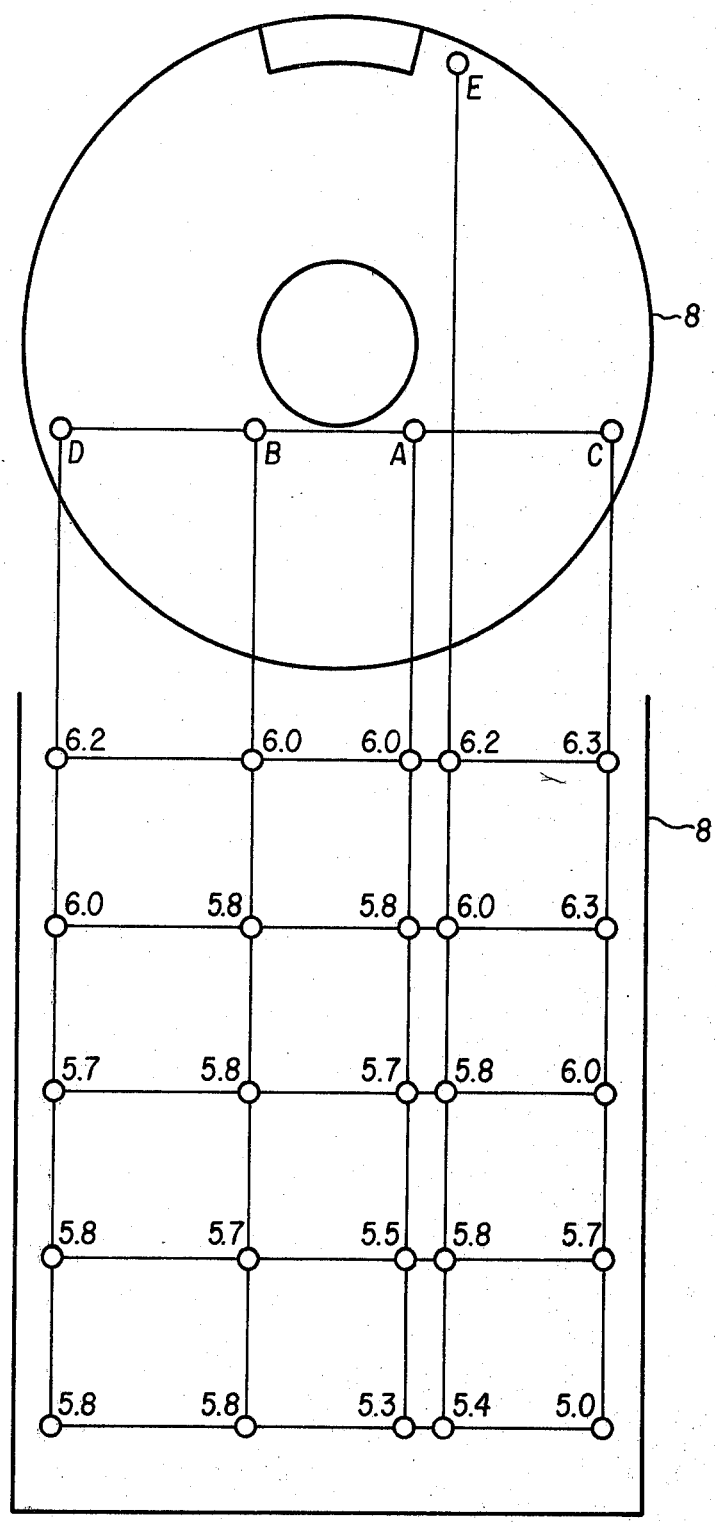
FIG. 9 is a diagram showing the dissolved oxygen uniformity in a system employing the aeration apparatus of FIG. 2.

The extent of uniformity of dissolved oxygen in a system in which the reactor aeration apparatus of FIG. 2 is employed is shown in FIG. 9. The D.O. (Dissolved Oxygen) uniformity illustrated was measured by placing D.O. probes in a 45,000 gallon pilot plant basin. Continuous monitoring of the D.O. probes during oxygenation indicates the degree of mixing and absence of dead or quiescent zones in the basin. Reference characters A, B, C, D and E refer to the positions of the oxygen probes. During the measurements illustrated in FIG. 8, the influent rate was approximately 150 gallons per minute and the recycled (returned) sludge rate was approximately 100 gallons per minute. The water temperature was measured to be approximately 66° F. The average dissolved oxygen in the system was found to be 5.8 having a 22% variation. The percentages were calculated by dividing the difference between the maximum and minimum readings by the average dissolved oxygen and multiplying by 100.

Figure 10:
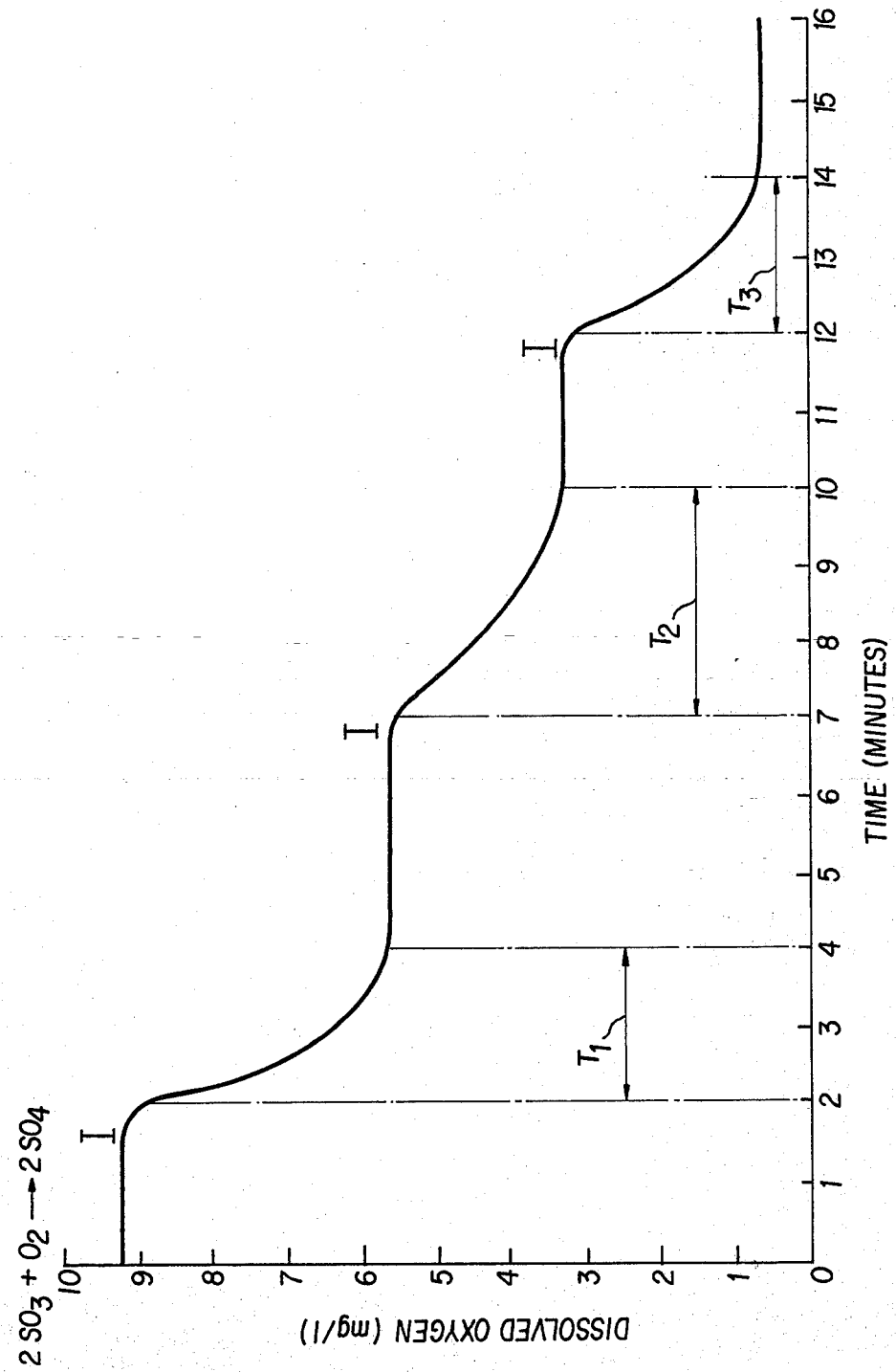
FIG. 10 is a graph showing the determination of dissolved oxygen uniformity of FIG. 9.

The following procedure, illustrated in FIG. 10, was used to extract the D.O. uniformity readings. Sodium sulfite was added and mixed in a vessel employing the aeration apparatus of the invention until zero dissolved oxygen readings were obtained. $T_1$, $T_2$ and $T_3$ refer to the reaction-mixing time involved during the process. Only the first five minutes of oxygentation were used, since during this time, the non-uniformity would be most noticeable. For each minute, four dissolved oxygen readings were averaged and the highest and lowest deviation from the average was noted. The quantity of air injected by the aeration apparatus was varied through a range of 7 to 1 and a set of readings was taken for each air flow rate. The average dissolved oxygen variation for all air rates was approximately ±0.1 mg of oxygen per liter. This dissolved oxygen variation of 5% or less indicates the excellent dissolved oxygen uniformity and degree of mixing afforded by the apparatus and system of aeration described herein.

It is pointed out, in particular, that even in the corners of the vessel floor, a high dissolved oxygen level existed. These locations in conventional aeration basins are typically dead zones in which the biological process tends to become anaerobic, disturbing the entire bioconversion process in the vessel itself.

The system involved herein employs both air and water (and suspended solids) flow downward through pre-mixing draft tube 6. In such a system it is preferable to maintain the water flow at a preset volume. The volumetric ratio of air to water can be determined by the volume of the air flow. Reported studies of prior art two-phase flow systems indicate that, if the water to air ratio exceeds 0.5:1, the flow becomes unstable and large slugs of air are formed in the pipe. In the invention described herein, the water to air ratio may be as high as 2.5:1.0 and such ratios were found to generate a fine dispersion of micro-bubbles of air. In fact, ratios as high as 2.8:1.0 having been successfully used with the disclosed apparatus. The best range of velocities through the draft tube is 2.5 to 25 feet per second and, through the nozzle, 5 to 75 feet per second to form fine bubble dispersions.

It should also be noted that the invention process described herein not only produces the required oxygen transfer and mixing action within the aeration basin, but does so with a minimum of wasted energy, i.e., virtually all the mechanical horsepower energy input to the liquid by the pumping system (including the injected air) is used effectively to dissolve the oxygen, transfer it to the cells, and secure maximum homogeneity in the bio-conversion process. Thus there is little wasted liquid motion, particularly at the surface, to consume valuable energy. In addition, the double-flow pattern further enhances the transfer of oxygen to the bio-mass by entrapping any escaping air bubbles going directly to the surface through the shearing action of the countercurrents.

In summary, the reactor aeration apparatus and process described herein produces a most homogeneous distribution of dissolved oxygen and bio-conversion processing within an aeration basin while utilizing the minimum amount of energy. It is because of these characteristics that the process and apparatus is especially useful for utilization in the aeration stages of wastewater treatment plants.

FIG. 3 illustrates another embodiment of an aeration mixing apparatus according to the invention which does not utilize a propeller or other moving part in the draft tube or outer mixing vessel. In the illustrated system, dual draft tubes 30 and 31 are located within outer mixing vessel 8. Incoming raw influent and recycled activated sludge enter trough 21 at any convenient plant location. The trough is connected to a loop 22. Trough 21 is connected to the loop 22 via an opening in the bottom of the trough 21 which is in registry with an opening in the loop 22. The lower portion of loop 22 includes funnel openings 23 and 23' which have a function similar to the funnel means of FIG. 2 and converge to a single conduit connected to the suction end of an external pumping system 24. The pumping system 24 includes a gate valve 25, flexible connection 26, and pumping means 27. The discharge end of the external pumping system is split and connected to pre-mixing draft tubes 30 and 31 located in the outer mixing vessel 8.

The trough 21, loop 22 and funnel opening 23, in combination with the external pumping system form the mixing means for premixing the contents of the outer mixing vessel and incoming liquid stream from trough 21, which together with dual draft tubes 30 and 31, form critical features of the invention. The flow from the trough 21 and into the loop 22 is an opposing flow which is downwardly directed. The downwardly-directed flow is inwardly directed at points W to a tee-fitting 42 connected to the suction of the external pumping means. At points W are connected the funnel openings 23 to enhance mixing of the contents of the vessel 8 with the incoming partially premixed raw sewage and recycled activated sludge from the trough 21. The external pumping means discharge end is connected to a tee-fitting 43 resulting in opposing flow to the draft tubes 30 and 31.

The embodiment of FIG. 3 has several advantages over the embodiment of FIG. 2. The use of the trough 21 as a feed conduit for the incoming raw sewage (waste-water) and recycled activated sludge permits premixing of these incoming flow components. Also the trough in combination with loop 22 permits still further premixing of the incoming flow components with the recycled outer vessel mixed liquid contents such that there is very effective mixing even before the combined flows reach the tee-fitting 43 leading to the draft tubes. Accordingly, the turbulent flow patterns in the premixing draft tubes 30 and 31 assure essentially complete premixing of the recycled vessel contents and incoming liquid by the time the flow reaches the air injectors 32 and 33. Therefore, the incoming air can immediately begin to supply the necessary oxygen to the biological reaction as it is absorbed by the liquid.

Another important advantage of the embodiment of FIG. 3 is that it becomes possible to utilize a single pump means for two pre-mixing draft tubes. Also, there are no moving parts, such as a pump propeller within the outer vessel or draft tube, thus simplifying maintenance in the event that there is a motor malfunction. In addition, elimination of the propeller avoids other potential problems such as clogging, oil leakage in the draft tube, etc.

Compressed air supply 29 is controlled by a butterfly valve 28 and supplies compressed air to annular injectors 32 and 33, illustrated in detail in FIG. 5. An air supply 36 is connected to an annular channel 37 having a radius R. The annular channel 37 surrounds the draft tube and has a continuous downwardly-directing circumferential opening 38 which injects air into the liquid traveling down the draft tube. FIG. 6 is a cross-sectional view taken along lines 6—6 of FIG. 5. As can be seen by referring to the cross-sections of the annular channel as illustrated in FIGS. 5 and 6, the area of a cross-section of the annular channel decreases as the distance of the cross-section from the air supplying conduit 36 increases. In other words, the distance $d_1$ from the axis A—A of the draft tube and the center C of the radius R of the annular channel 37 decreases as the distance from the air supply 36 increases. Therefore, $d_1$ is greater than $d_2$. Alternatively, the distance $d_3$ from the concentric reducer 39 to the center C decreases as the distance from the air supply 36 decreases.

Referring to the inner portion of the annular injectors 32, it can be seen that each injector has a concentric reducer 39 located immediately adjacent the annular channel 37. Immediately below the concentric reducer 39 is a concentric expander 40 within which the continuous downwardly directing circumferential opening 38 is located. Immediately below the concentric expander 40 is a concentric reducer 41 which conforms the diameter of the draft tube immediately below the annular injectors 32 and 33 to be equal to the diameter of the draft tube immediately above the annular injectors 32 and 33.

FIG. 4 illustrates another embodiment of an aeration mixing apparatus according to the invention. In this embodiment dual draft tubes 50 and 51 are located within the outer mixing vessel (not shown). Incoming raw influent and recycled activated sludge are fed to a submersible pump 52 at arrow I which can be from an open trough as in FIG. 3 or a closed conduit. In the submersible pump 52 the incoming flows I are combined with recycled vessel mixed liquid contents which enter the suction side of the pump via funnels 53 and 53' and conduits 55 and 56, respectively. The discharge end of the submersible pump is split and connected to draft tubes 50 and 51 through conduits 57 and 58.

In this embodiment each funnel 53 and 53' together with its associated conduit to the pump 52, in combination with the submersible pump form the mixing means for premixing the contents of the outer mixing vessel and incoming liquid stream in a similar manner to the alternate embodiments of FIGS. 2 and 3.

Compressed gas supply is injected into the draft tubes 50 and 51 through air inlet ports 61 and 62. The compress gas (from an external source, not shown) is fed to feed lines associated with each air inlet port through a suitable tee-fitting 60 located on or in close proximity to the vertical centerline of the vessel.

This embodiment also shows the splash plates 59 and 59' associated with nozzles 63 and 63', respectively, spaced a short distance (about 6 inches) away from the bottom 54 of the outer mixing vessel.

This embodiment is advantageous when retrofitting an existing vessel having limited working area where an external pump cannot be fitted easily within the preexisting physical space contraints.

It should be kept in mind when considering the discussions of the above embodiments and the shapes and location of shapes noted that such shapes and locations are critical to the invention disclosed herein. For example, the funnel 7 and inlet slots 15 illustrated in the embodiment of FIG. 2 provide for a mixing function which significantly improves the efficiency of the disclosed system. Also, the location of the concentric reducer 39, concentric expander 40 and concentric reducer 41 of the annular injectors 32 and 33 create a turbulence in the downward flow of the draft tubes which significantly increases efficiency of the system and provides for high dissolved oxygen amounts.

In fact, the above systems result in a number of general aeration characteristics which significantly impact upon the design and construction of the invention. Briefly, use of the high rate mixing process which is enabled by the invention disclosed above results in much shorter detention times for the aeration stage to accomplish what is normally accomplished in conventional surface aeration basins. Detention times of one-quarter to one-half the conventional detention times are readily obtained by the invention and provide the same results as conventional systems. Such reductions in detention times result directly in the use of smaller volume basins, resulting in basin capital cost savings of from 50 to 75%. Further, since it is also desirable to use deep tank configurations for high oxygen transfer efficiency, very substantial reductions in land areas required for the aeration stages of this invention can be realized. Typically, reduction factors of 5 to 10 could be gained over conventional systems.

It has also been demonstrated that the aeration apparatus and process of the invention disclosed herein has considerable load surge capacity. This characteristic results from the high MLSS (mixed liquid suspended solids) operating level which can be used and the high oxygen uptake rate together with the independent control of air injection into the system. Surges of 50 to 100% in loading can be handled without significant deterioration in effluent.

Finally, of particular importance is that the apparatus and process described herein lends itself to automatic control. With the regulation of liquid velocities, air velocity and volume, and a basically uniform process, automatic control of such aeration stages could be created to ensure both good plant operation (in terms of quality of effluent for varying influent conditions) and minimum energy consumption. For example, during the day when higher sewage inflow rates and higher BODs content can be expected higher oxygen feed rates to the system will be necessary. As the sewage inflow rates and BODs content decreases during the late evening hours, the dissolved oxygen content in the aeration mixing vessel will increase as less oxygen is consumed in the biological process. Therefore, by monitoring the dissolved oxygen content of the mixed liquor in the outer mixing vessel the air flow rates can be automatically adjusted, for example, by motor adjusted valves in the air flow lines to compensate for changing conditions in the incoming sewage flow rates with the corresponding savings in energy consumption.

When considering system designs, and the size of tanks required therein, the aspect ratio of a tank is critical to the proper functioning of the aeration system described herein. In general, the aspect ratio of a tank is defined as the diameter of the tank divided by the depth of the tank. It has generally been noted that, in order to provide proper dissolved oxygen levels and mixing as discussed above, the aspect ratio for the system should be less than 1:4 and greater than 0.20:1. Such an aspect ratio enables achieving a flow pattern which attains critical terminal velocities at the farthest point from the apparatus and provides results as diagrammed in FIGS. 8-10.

Another system consideration is the tank outlet. As shown in phantom in FIG. 3, the aerated mixture is withdrawn at or near the surface of the system and the tank 8. In particular, the tank may be constructed to provide for an overflow outlet weir system 35 which would permit mixed liquid which exceeds the volume of the outer mixing vessel 8 to flow over the wall of the vessel to the next state treatment. Alternatively, an outlet 34 may be provided near the top of a wall of the vessel 8.

Using the aeration process described above, as employed by the apparatus illustrated particularly in FIGS. 2, 3 or 4, the best total system configuration for a sewage treatment plant can be developed. Several key improvements over the conventional secondary waste treatment system can be seen. Aside from the usual bar screening and grit removal chambers, the waste-water treatment facility utilizing the system configuration of the invention described and employed herein need not utilize a primary settling or clarifier stage although such stage may be required by local, state or Federal regulation. Such a state is extremely inefficient in producing the desired bio-conversion and is simply a carry-over from early plant designs in which aeration equipment was not available and was, therefore, added as a secondary state. The influent from the initial chamber may be directly taken into a high rate aeration stage wherein a high mixed liquid suspended solids level is maintained to rapidly convert the incoming $BOD_5$ to carbon dioxide, water, energy and added bio-mass (activated sludge solids). This high rate process is made possible by the utilization of the novel mixing aeration apparatus and process which is capable of delivering oxygen to the bio-mass as rates of up to 200 mg per hour. The typical detention time required in this high rate stage ranges from one-half to one hour, thereby requiring relatively small basin capacity. Approximately 90% of the incoming $BOD_5$ is converted with between 50 to 70% of the conversion products being in the form of cell growth or solids. This high rate stage is normally operated at MLSS levels of 6,000 to 7,500 mg or higher per liter. The F/M ratio, based on active mass, is approximately 0.6 providing nearly optimum flocculation and solids settling characteristics.

Within the constraints of any particular waste-water treatment problem, e.g., waste-water influent flow rates, $BOD_5$ content, available land space, ambient temperature conditions, etc., it becomes possible to design an efficient energy saving aeration mixing process and apparatus by following the above guidelines. In general, higher percentage oxygen transfer based on air volume flow rate to the premixing draft tube will be obtained at higher water to air ratios due to the higher concentration gradient and production of finer bubbles. However, the higher liquid flow rates are at the cost of higher horsepower requirements. Also, in general, too rapid liquid flow rates can be detrimental to the bio-mass. Liquid flow rates, therefore, should be kept below about 100 feet per second in the pre-mixing draft tube.

It is also preferred to design the pre-mixing tube and associated nozzle to provide a relatively constant ratio of the liquid flow rate in the tube to the flow rate in the nozzle. Generally, a preferred ratio is about 1:2, i.e., the flow rate in the tube is about 50% of the flow rate in the nozzle. However, the proportion can vary from about 10% to about 90%.

Other process and apparatus design parameters include such factors as the depth of the aeration basin. There is an essentially linear relationship between the tank depth and oxygen transfer since at higher hydraulic pressure bubble size decreases; however, horsepower requirements to overcome the hydraulic head correspondingly increase.

Another design factor is the minimum critical terminal velocity at the bottom of the tank. As noted earlier, this minimum critical terminal velocity is about 0.05 to 10 ft/sec. Also as noted earlier, the basin aspect ratio should be designed (where possible) to be within the range of 1:4 to 1:0.20.

Under preferred design conditions, detention times on the order of 30 minutes or less and vessel contents mixing times of 5 minutes or less (i.e., incoming liquids- raw sewage and recycled activated sludge-will be circulated through the vessel about once every 5 minutes and will be subjected to aeration mixing for about a total of 30 minutes).

System design criteria will also under optimum conditions take into account the lower oxygen absorption capacity of water at higher ambient temperatures. Therefore, at higher temperatures there will normally be a lower DO (dissolved oxygen) content which is countered by higher air flow rates.

Another design factor for some waste-water treatment systems is the dissolved ammonia content of the waste-water influent. It is a particularly advantageous feature of the present invention that ammonia conversion to harmless $NO_2$ and water can be successfully accomplished as an integral aspect of the mixing aeration process. That is, it has been observed that excess oxygen absorbed by the mixed liquor can be maintained at sufficiently high levels to oxidize the ammonia content of the waste water influent.

Conceptually, the high rate aeration stage is followed in the system configuration by a second, bio-oxidation stage. Its primary purpose is to remove any residual $BOD_5$ and to consume through endogenous respiration the solids produced in the first stage. This stage inhibits solids buildup and reduces sludge wastage. To complete its mission in the system, this second aeration stage will normally have a much longer detention time, ranging from 1.5 to 3 hours. In this specific design, both high rate aeration and bio-oxidation can be conducted in the same basin. Only about 35% of the total solids are oxidized. This mass reduction produces a relatively small impairment of the flocculant. In this manner, nearly optimum flocculation characteristics are maintained and little settling difficulty exists in the clarifier stage of the system.

As an indication of the versatility of the invention aeration mixing system, it becomes possible in a total waste-water treatment facility to provide a first aeration tank and second aeration tank in series and to convert the second aeration tank to a bio-oxidation tank at non-peak loading periods. This is simply accomplished by diverting off the incoming raw sewage and recycled activated sludge from entering the second aeration tank. For example, in the embodiment of FIG. 3, the mixed liquor overflow from the vessel 8 passing over weir system 35 will be the influent to a second similar adjoining aeration mixing vessel. During high peak periods of incoming raw waste-water, a portion of the raw waste-water and recycled sludge will be fed through the trough and loop mixing means to the second aeration vessel to undergo mixing aeration as discussed above in connection with FIG. 3. During slow periods, the flow in the trough leading to the second mixing vessel can be terminated (for example by a sliding gate means) to allow bio-oxidation to occur.

Even further flexibility can be built into the system by providing two parallel sets of two series-connected aeration mixing vessels with a trough system interconnecting the in-parallel vessels and the in-series vessels. Still further, this arrangement allows the external pump systems to be quickly interchanged from one series of vessels to the other or to replace or repair one external pump without interrupting operation of the aeration process.

The clarifier stage used in a system employing the invention is conventional and is required to produce a settling and compaction ratio of about 2:1, i.e., the solids level ranging from 6,000 to 7,500 mg per liter are increased at the clarifier underflow to approximately 12,000 to 15,000 mg per liter for recycling to the aeration/bio-oxidation basin.

To complete this total system or a plant configuration, a recycle loop is included to bring the clarifier sludge back to the aeration vessel and a tertiary filter stage and a postclarifier disinfection stage are inserted prior to the release of the effluent into the river. An aerobic holding tank may be provided in the waste sludge line to store sludge while the plant vacuum filter is concentrating on other plant sludge. Stored sludge could be used to feed back into the system as necessary during low $BOD_5$ influent levels.

TEST OPERATION

The facilities available and used for testing were at the Dallas Water Reclamation Research Center (DWRRC) and are summarized in Table 1. The wastewater which was used in the various treatment process was primary effluent directly from the Dallas Municipal Treatment Plant at rates adequate to operate at full capacity any test plant configuration possible at the Research Center. Typical process loading available with this primary effluent for aeration processing ranged from approximately 80 to 160 lbs. of $BOD_5/1,000$ cubic feet of liquid. The Center had two aeration tanks, both of which were used for substantial periods of time to fully substantiate scale up from laboratory design relationships. The two tanks available provided capacities of 7,500 and 45,000 gallons with corresponding throughput rates of approximately 0.22 and 0.75 MGD, respectively.

TABLE 1

| (DWRRC Facilities) | |
|---|---|
| Waste-water Treated | Primary Effluent |
| Process Loading | 80–160 lbs. $\dfrac{BOD_5}{10^3 \text{ cu. ft.}}$ |
| Aeration Tanks | 7,500 gal. |
|  | 45,000 gal. |
| Corresponding Influent Rates | 0.22 mgd. |
|  | 0.75 mgd. |
|  | mgd = million gals per day |
| Clarifier (RIM-FLO) | 63,500 gal. |

The two basins were equipped with reactor assemblies having a structure as illustrated in FIG. 2 to create a complete aeration process unit. The output of these aeration basins was fed into an existing Rim-Flo clarifier of approximately 63,500 gallons. This clarifier operation proved satisfactory for the aeration testing (in spite of a design flaw) in that significant settling and compaction was produced such that high solids densities could be returned to the aeration stage for testing of various modes of the aeration operation. The air supply was provided by an external compressor and both the primary effluent and the return sludge were fed into the funnel as described above.

Representative high rate process results obtained at this test facility over a number of months of operation are presented in Table 2 for the 7,500 gallon tank. A review of this table indicates the type of performance readily obtainable with the reactor mixing process and apparatus in comparison to the conventional aeration stage. The vessel was operated at an MLSS level of 6,000 mg/l while treating an influent with a $BOD_5$ value of 60 mg/l. The $BOD_5$ level of the effluent was approximately 5 mg/l for a removal rate in excess of 90%. The performance cited above was achieved during operating tests in which the loading was in the range of 75 to 150 lbs. $BOD_5/10^3$ cu. ft./day.

TABLE 2

| OPERATING PARAMETERS | |
|---|---|
| (Reactor Aerator in No. 2 Basin - DWRRC) | |
| Type Waste-Water | Primary Effluent |
| Av. Influent Rate (G.P.M.) | 150 |
| Av. Influent $BOD_5$ (MG/L) | 60 |
| Aerator Vol. (GAL.) | 7,500 |
| Detention Time (MIN.) | 50 |
| Return Sludge Rate (G.P.M.) | 100 |
| Av. MLSS (MG/L) | 6,000 |
| Av. Mixed Liquid D.O. (MG/L) | 3.0 |
| $BOD_5$ Removed (%) | 93 |
| Av. Effluent $BOD_5$ (MG/L) | 5 |
| Loading (LB. $BOD_5/10^3$ CU. FT./DAY) | 75 to 150 |
| $O_2$ Uptake Rate (MG/L/HR) | 100 to 190 |

This high loading capability is, of course, made possible by the high oxygen uptake rates achieved which are typically 3 to 6 times those achievable when surface aerators are employed. The detention time required is typically only 50 minutes, much shorter than most aeration operations. Furthermore, this high rate stage was operated with a return sludge flow carrying solids at a level of 15,000 mg/l and equal to ⅔ of the influent. This high rate mode of operation was also tested for surge capability. The system was often run for days at a time at MLSS levels of 9,000 to 10,000 mg/l with no sludge wastage and with recycled solid levels reaching approximately 16,700 mg/l. Such surge performance is possible because of the high oxygen uptake rates and the ability to use and supply all oxygen levels required as provided by the apparatus and process.

A summary of the key aeration test results indicating critical performance parameters is presented in Table 3. These results were for a range of operating conditions with vessel designs using both 7,500 and 45,000 gallon tanks in an effort to relate performance with design to insure scale-up satisfaction. The key performance characteristics were as follows. Oxygen transfer efficiencies ranging from 15 to 50% were obtained depending upon a number of design and operating conditions but particularly dependent upon the aspect ratio of the vessel used. Typically, the deeper the basin for a fixed diameter, the higher the transfer efficiency. This result is just the opposite of that obtained with conventional aeration basins using surface aeration systems. In these instances, shallow tanks must be used and transfer efficiencies are typically only in the order of 8–12%. Thus, it is possible with the aeration mixing apparatus and process employed thereby to achieve improvements in oxygen transfer efficiencies, particularly with deeper tanks, by factors of 2–5 over conventional procedures.

TABLE 3
SUMMARY AERATION TEST RESULTS

| | | |
|---|---|---|
| Oxygen Transfer Efficiencies | 15–50% | |
| Pounds $O_2$ / hp-hr | 3.5–5.2 | |
| $O_2$ Uptake Rate | 100–190 mg/l/hr | |
| MLSS Levels | Typical | 6000 mg/l |
| | | D.O. = 3.0 mg/l |
| | Surge (24 hr) | 9,000 mg/l |
| | | D.O. = 0.5 mg/l |
| $BOD_5$ Removal | Up to 90–95% | |

Concurrent with the high transfer efficiencies noted, efficient use of energy in delivering oxygen to the system is gained with delivery values of 3.5 to 5.2 lbs. of oxygen/hp-hr. Such values are substantially greater than those achieved by conventional surface aeration systems which typically run from 2 to 3. These two factors together, high transfer efficiency and high weight of oxygen transferred per unit energy, result in considerable saving in operating expenses through reduced consumption of electrical power.

Another parameter representing a marked improvement over other systems is the oxygen uptake rate which ranges some 3 to 6 times the rate of other systems in running as high as 190 mg/l/hr. Such rates mean that almost any possible bio-mass that can be sustained in an aeration basin can have adequate oxygen delivered using the apparatus and process. MLSS values ranging from normal high rate operating levels of 6,000 mg/l up to surge levels of 9,000 or greater are quite representative of this process while maintaining residual D.O. levels of 3.0 to 0.5 mg/l, respectively. This high solids level operation made possible with the apparatus and process, in turn, results in efficient basin use for any specified volume of waste-water to be treated. Furthermore, this improvement in basin capacity utilization is not gained at a sacrifice in process quality. The uniformity already illustrated in FIG. 8 does not vary significantly throughout the vessel; thus, there are no dead zones or anaerobic processing regions, even at low residual oxygen levels. Finally, quite typically for all tests performed, the $BOD_5$ removal was exceptionally good, resulting generally in values of 90 to 95%.

Various changes may be made in the details of the invention, as disclosed, without sacrificing the advantages thereof or departing from the scope of the appending claims. Furthermore, although the present invention has been disclosed and discussed with particular regard to its exceptional advantages in terms of sewage treatment, it may be understood that the invention may be employed in several industrial applications wherein the mixing of a liquid and a gas is required.

What is claimed is:

1. In an apparatus for treating waste water with a gas such as air, oxygen or other oxygen containing gas in an activated sludge aeration process including:
   (a) an outer mixing vessel;
   (b) outlet means from said outer mixing vessel for continuous withdrawal of mixed gas and waste water which form the contents of said outer mixing vessel;
   (c) a pre-mixing draft tube substantially vertically axially aligned within said outer mixing vessel and having an upper end and a lower end;
   (d) a nozzle opening at the lower end of said draft tube;
   (e) mixing means for mixing the contents of said outer mixing vessel with incoming raw waste water and recycled activated sludge, said mixing means connected to the upper end of said draft tube and supplying the contents, raw waste water and activated sludge to said draft tube;
   (f) said mixing means comprising a trough means for receiving the raw waste water and recycled activated sludge and a conduit means connecting said trough means to said draft tube, said conduit means having a funnel opening therein located within the contents of said outer mixing vessel for introducing the contents and the sewage into said draft tube;
   (g) air inlet means for introducing the air directly into said draft tube between the upper and lower ends thereof for mixing the air with the sewage and contents flowing through the draft tube; and
   (h) pump means for pumping the mixed contents and liquid through said draft tube; the improvement comprising said conduit means including a loop having a top portion connected to said trough means and a bottom portion within which the funnel opening is located whereby waste water flowing into the trough means initially flows into the loop in opposing directions which eventually converge and the funnel opening is located at the point in the loop where the convergence begins.

2. The apparatus of claim 1, wherein a tee-fitting is located in the bottom portion of the loop and is connected to a suction side of said pump means.

3. The apparatus of claim 2, wherein a discharge side of said pump means is connected to a second tee-fitting which is connected to said draft tube and a second draft tube, whereby opposing flow through the second tee terminates in the draft tube and the second draft tube.

* * * * *